(12) United States Patent
Bharkhada et al.

(10) Patent No.: US 12,518,443 B2
(45) Date of Patent: Jan. 6, 2026

(54) SYSTEM METHOD ESTIMATE ATTENUATION CORRECTION FOR REPEATED SCANS AND LOW DOSE SCANS IN LONG AXIAL FOV PET SCANNERS

(71) Applicant: Siemens Medical Solutions USA, Inc., Malvern, PA (US)

(72) Inventors: Deepak Bharkhada, Knoxville, TN (US); Vladimir Panin, Knoxville, TN (US); Mohammadreza Teimoorisichani, Knoxville, TN (US); Maurizio Conti, Knoxville, TN (US); Hasan Sari, Bern (CH)

(73) Assignee: Siemens Medical Solutions USA, Inc., Malvern, PA (US)

( * ) Notice: Subject to any disclaimer, the term of this patent is extended or adjusted under 35 U.S.C. 154(b) by 370 days.

(21) Appl. No.: 18/004,685

(22) PCT Filed: Aug. 21, 2021

(86) PCT No.: PCT/US2021/071139
§ 371 (c)(1),
(2) Date: Jan. 9, 2023

(87) PCT Pub. No.: WO2022/056508
PCT Pub. Date: Mar. 17, 2022

(65) Prior Publication Data
US 2023/0252694 A1     Aug. 10, 2023

Related U.S. Application Data

(60) Provisional application No. 63/199,332, filed on Dec. 21, 2020.

(51) Int. Cl.
*G06T 11/00* (2006.01)
*A61B 6/00* (2006.01)
(Continued)

(52) U.S. Cl.
CPC ............ *G06T 11/005* (2013.01); *A61B 6/037* (2013.01); *A61B 6/4266* (2013.01);
(Continued)

(58) Field of Classification Search
None
See application file for complete search history.

(56) References Cited

U.S. PATENT DOCUMENTS

2018/0330233 A1* 11/2018 Rui ...................... G06N 3/045

FOREIGN PATENT DOCUMENTS

| CN | 101530330 | 9/2009 |
|---|---|---|
| CN | 108474862 | 8/2018 |

(Continued)

OTHER PUBLICATIONS

Translation for CN 110151210 (Year: 2019).*
(Continued)

*Primary Examiner* — Lennin R Rodriguezgonzalez

(57) ABSTRACT

Various systems and computer-implemented methods for background radiation based attenuation correction are disclosed. A first set of nuclear scan data including first scan data associated with a first imaging modality having a long-axial field of view and first background radiation data is received and a first background radiation attenuation map is generated by applying a trained machine-learning model to the first background radiation data. A first set of attenuation corrected scan data is generated by performing attenuation correction of the first scan data based only on the first background radiation attenuation map and a first image is reconstructed from the first set of attenuation corrected scan data. The disclosed background radiation based attenuation correction may be used for longer duration scans, repeat scans, and/or low-dose clinical applications, such as pediatric applications, theranostics, and/or other suitable applications.

16 Claims, 8 Drawing Sheets

(51) Int. Cl.
    *A61B 6/03*         (2006.01)
    *A61B 6/42*         (2024.01)

(52) U.S. Cl.
    CPC .......... *A61B 6/5205* (2013.01); *A61B 6/5264* (2013.01); *G06T 2210/41* (2013.01)

(56) References Cited

FOREIGN PATENT DOCUMENTS

| | | |
|---|---|---|
| CN | 110151210 | 8/2019 |
| WO | 2020214911 | 10/2020 |

OTHER PUBLICATIONS

International Search Report for Corresponding PCT Application No. PCT/US2021/071139, mailed Oct. 27, 2021.

Shi, Luyao et al: "Deep learning-based attenuation map generation for myocardial perfusion SPECT"; European Journal of Nuclear Medicine, Springer Verlag, Heidelberg, DE; vol. 47, No. 10, Mar. 26, 2020 (Mar. 26, 2020), pp. 2383-2395, XP037208698.

Cheng, Li et al: "Maximum likelihood activity and attenuation estimation using both emission and transmission data with application to utilization of Lu-176 background radiation in TOF PET", Medical Physics., [Online]; vol. 47, No. 3, Jan. 28, 2020 (Jan. 28, 2020), pp. 1067-1082, XP55802046.

Berker, Yannick et al: "Attenuation correction in emission tomography using the emission data-A review"; Medical Physics, AIP, Melville, NY, US; vol. 43, No. 2, Jan. 14, 2016 (Jan. 14, 2016), pp. 807-832, XP012211171.

\* cited by examiner

SYSTEM METHOD ESTIMATE ATTENUATION CORRECTION FOR REPEATED SCANS AND LOW DOSE SCANS IN LONG AXIAL FOV PET SCANNERS

CROSS-REFERENCE TO RELATED APPLICATION

This application claims priority to International Patent Application PCT/US2020/070506, filed on Sep. 9, 2020, entitled "IMPROVED ATTENUATION MAP GENERATED BY LSO BACKGROUND," the disclosure of which is incorporated by reference herein in its entirety. This application also claims priority to U.S. Provisional Patent Application 63/199,332, filed Dec. 21, 2020, entitled "Method to estimate attenuation correction for repeated scans and low dose scans in long axial FOV PET scanners," the disclosure of which is incorporated by reference herein in its entirety.

TECHNICAL FIELD

This application relates generally to attenuation correction of nuclear imaging and, more particularly, to attenuation correction of low-dose nuclear imaging obtained using systems including lutetium oxyorthosilicate (LSO) or lutetium yttrium oxyorthosilicate (LYSO) scintillation crystals.

BACKGROUND

During nuclear imaging, a patient is positioned on a table and data is obtained using one or more scanning modalities, such as, for example, computerized-tomography (CT), positron-emission tomography (PET), single-photon emission computerized tomography (SPECT), magnetic resonance (MR) etc. Multiple data sets can be collected for a single patient. Different types of reconstructions are generated to control for and/or eliminate artifacts. Although each reconstruction uses different parameters, the underlying patient is the same for each reconstruction.

In long-axial field of view (LAFOV) systems, acquisition times and sensitivity are increased over typical FOV systems. Radiation application in CT scans is increased due to the longer acquisition times. In addition, patient motion is more likely in LAFOV, resulting in higher distortion and less correlation between a CT attenuation map and a second scanning modality.

SUMMARY

In various embodiments, a computer-implemented method for attenuation correction is provided. The method includes the steps of receiving a first set of nuclear scan data including first scan data associated with a first imaging modality having a long-axial field of view and first background radiation data, generating a first background radiation attenuation map by applying a trained machine-learning model to the first background radiation data, generating a first set of attenuation corrected scan data by performing attenuation correction of the first scan data based only on the first background radiation attenuation map, and reconstructing a first image from the first set of attenuation corrected scan data.

In various embodiments, a system including a first imaging modality having a long-axial field of view and configured to generate a first set of scan data and a plurality of detectors that generate background radiation data is disclosed. The system further includes a non-transitory memory having instructions stored thereon and a processor configured to read the instructions to generate a first background radiation attenuation map by applying a trained machine-learning model to the first background radiation data, generate a first set of attenuation corrected scan data by performing attenuation correction of the first scan data based only on the first background radiation attenuation map, and reconstruct a first image from the first set of attenuation corrected scan data.

In various embodiments, a method of nuclear imaging is disclosed. The method includes applying a dose of imaging tracer, obtaining a first set of nuclear scan data including first scan data associated with a first imaging modality having a long-axial field of view and first background radiation data, generating a first background radiation attenuation map by applying a trained machine-learning model to the first background radiation data, generating a first set of attenuation corrected scan data by performing attenuation correction of the first scan data based only on the first background radiation attenuation map, obtaining a second set of nuclear scan data including second scan data associated with the first imaging modality and second background radiation data, generating a second background radiation attenuation map by applying the trained machine-learning model to the second background radiation data, generating a second set of attenuation corrected scan data by performing attenuation correction of the second scan data based only on the second background radiation attenuation map, and reconstructing a first image from the first set of attenuation corrected scan data and a second image from the second set of attenuation corrected scan data. The first set of nuclear scan data is based on the dose of imaging tracer and is obtained at a first time and the second set of nuclear scan data is based on the dose of imaging tracer and is obtained at a second time.

BRIEF DESCRIPTION OF THE DRAWINGS

The following will be apparent from elements of the figures, which are provided for illustrative purposes and are not necessarily drawn to scale.

DETAILED DESCRIPTION

This description of the exemplary embodiments is intended to be read in connection with the accompanying drawings, which are to be considered part of the entire written description.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for performing attenuation correction using attenuation maps obtained from LSO (lutetium oxyorthosilicate)-based or LYSO (lutetium yttrium oxyorthosilicate)-based background radiation data as well as with respect to methods and systems for training a neural network to generate attenuation maps from LSO/LYSO background radiation data. Features, advantages or alternative embodiments herein can be assigned to the other claimed objects and vice versa. In other words, claims for methods and systems for training a neural network to generate an attenuation map using LSO/LYSO background radiation data can be improved with features described or claimed in context of the methods and systems for performing attenuation correction using LSO/LYSO background radiation data, and vice versa.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

Figure 1:
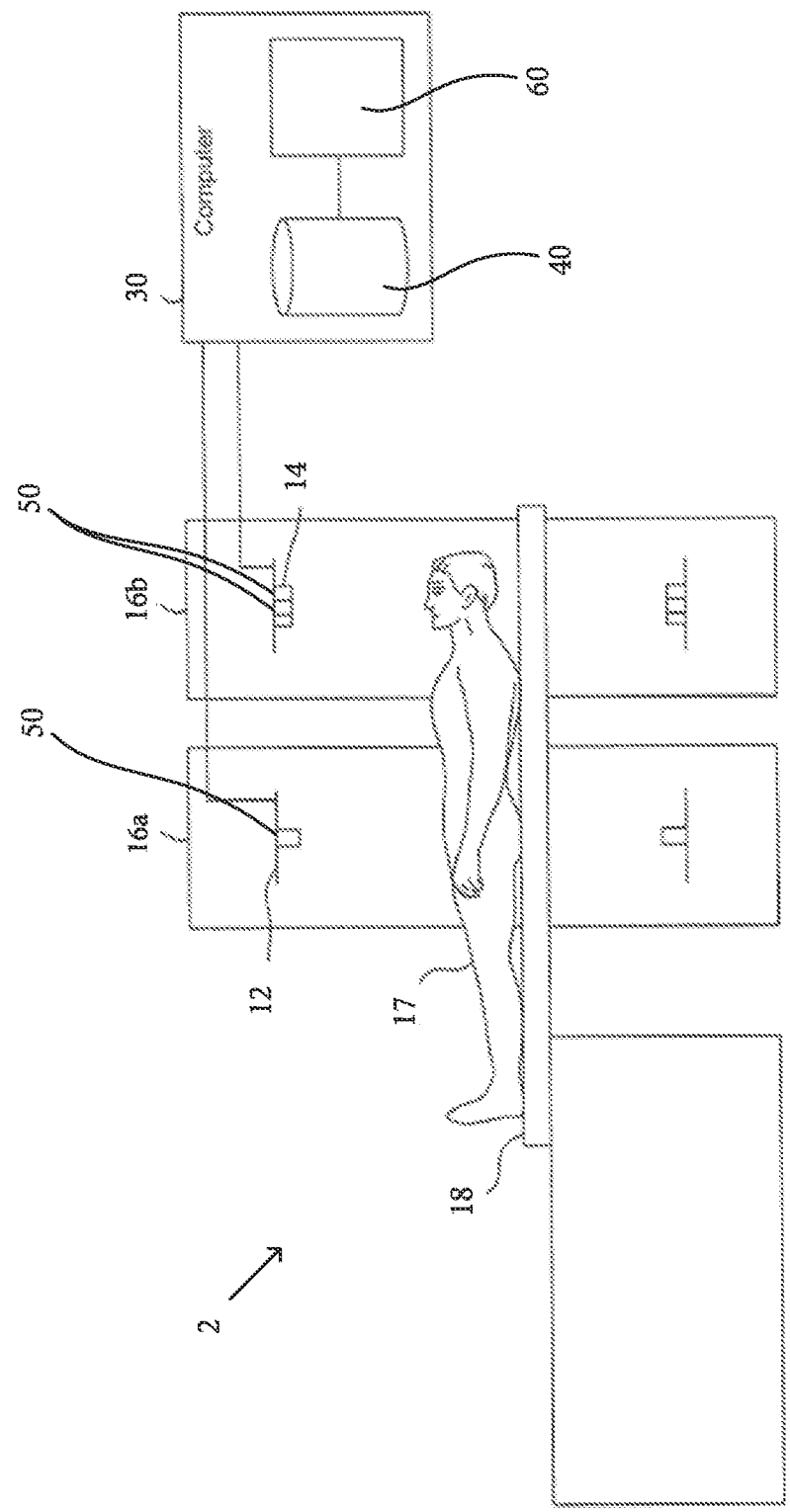
FIG. 1 illustrates a nuclear imaging system, in accordance with some embodiments.

FIG. 1 illustrates one embodiment of a nuclear imaging system 2, in accordance with some embodiments. The nuclear imaging system 2 includes a scanner for at least a first modality 12 provided in a first gantry 16a. The first modality 12 can include any suitable imaging modality, such as a positron emission tomography (PET) modality. A patient 17 lies on a movable patient bed 18 that can be movable within a gantry. In some embodiments, the nuclear imaging system 2 includes a scanner for a second imaging modality 14 provided in a second gantry 16b. The second imaging modality 14 can be any suitable imaging modality, such as, for example, PET modality, a SPECT modality, a CT modality, magnetic resonance (MR) modality, and/or any other suitable imaging modality. Each of the first modality 12 and/or the second modality 14 can include one or more detectors 50 configured to detect an annihilation photon, gamma ray, and/or other nuclear imaging event. In some embodiments, one or more of the detectors 50 generate background radiation data during a scan.

Scan data from the first modality 12 and/or the second modality 14 is stored at one or more computer databases 40 and processed by one or more computer processors 60 of a computer system 30. The graphical depiction of computer system 30 in FIG. 1 is provided by way of illustration only, and computer system 30 can include one or more separate computing devices. The nuclear imaging data sets can be provided by the first modality 12, the second modality 14, and/or can be provided as a separate data set, such as, for example, from a memory coupled to the computer system 30. The computer system 30 can include one or more processing electronics for processing a signal received from one of the plurality of detectors 50. In some embodiments, the scan data includes background radiation-based attenuation. The computer system 30 can use one or more background radiation based attenuation maps during image reconstruction to correct for background radiation attenuation.

In some embodiments, the computer system 30 is configured to generate at least one initial background radiation based attenuation map for use in image reconstructions of data obtained by the first modality 12 and/or the second modality 14. The background radiation based attenuation map can be generated using any suitable parameters, such as any suitable algorithms, noise values, event counts, etc. The attenuation map can be generated and/or improved by a trained neural network (or function). In some embodiments, the initial background radiation based attenuation map is generated using a maximum-likelihood transmission (MLTR) algorithm, although it will be appreciated that other algorithms can be applied to generate the initial background radiation based attenuation map.

Figure 2:
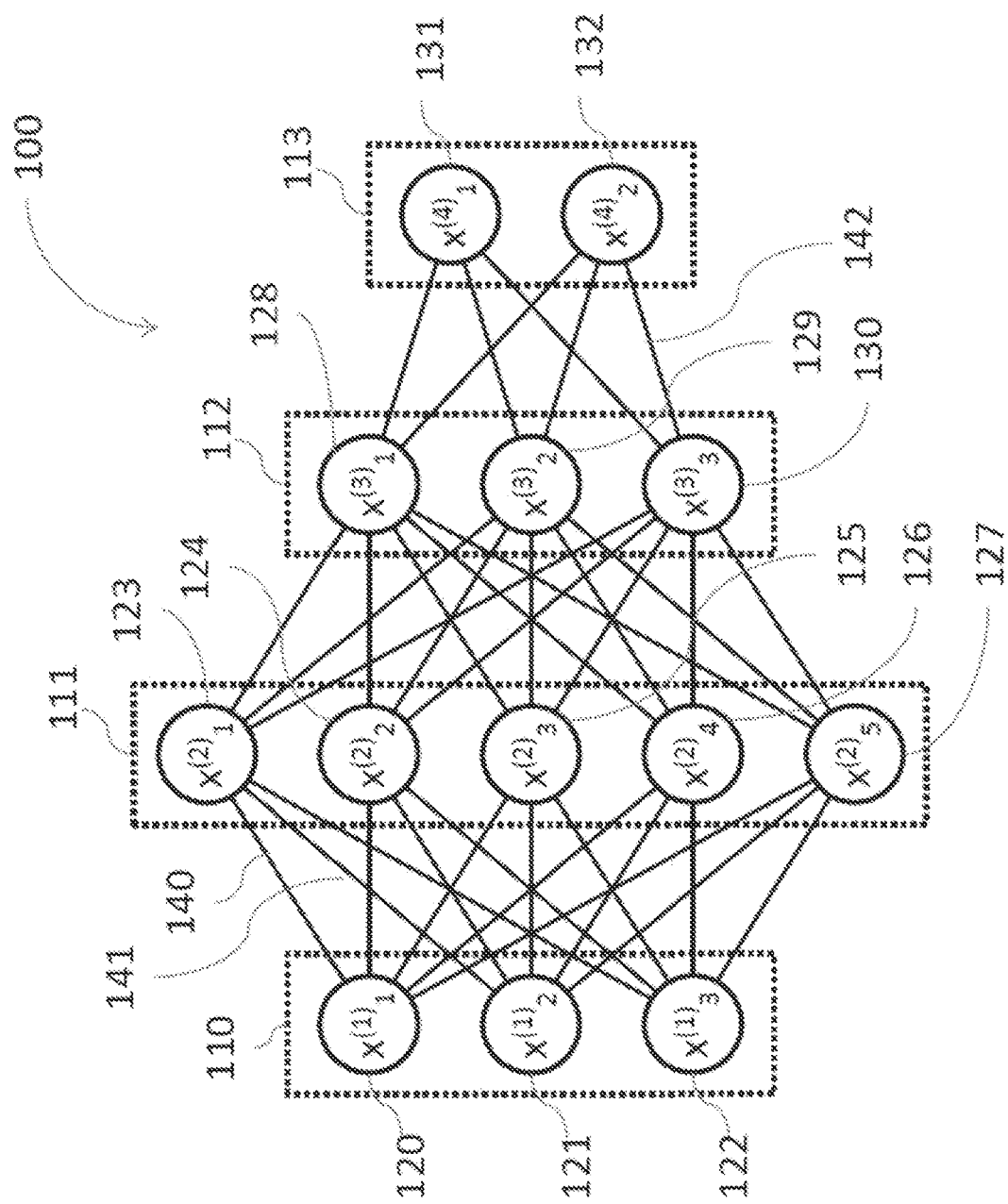
FIG. 2 illustrates an embodiment of an artificial neural network, in accordance with some embodiments.

FIG. 2 displays an embodiment of an artificial neural network 100. Alternative terms for "artificial neural network" are "neural network," "artificial neural net," "neural net," or "trained function." The artificial neural network 100 comprises nodes 120-132 and edges 140-142, wherein each edge 140-142 is a directed connection from a first node 120-132 to a second node 120-132. In general, the first node 120-132 and the second node 120-132 are different nodes 120-132, although it is also possible that the first node 120-132 and the second node 120-132 are identical. For example, in FIG. 2 the edge 140 is a directed connection from the node 120 to the node 123, and the edge 142 is a directed connection from the node 130 to the node 132. An edge 140-142 from a first node 120-132 to a second node 120-132 is also denoted as "ingoing edge" for the second node 120-132 and as "outgoing edge" for the first node 120-132.

In this embodiment, the nodes 120-132 of the artificial neural network 100 can be arranged in layers 110-113, wherein the layers can comprise an intrinsic order introduced by the edges 140-142 between the nodes 120-132. In particular, edges 140-142 can exist only between neighboring layers of nodes. In the displayed embodiment, there is an input layer 110 comprising only nodes 120-122 without an incoming edge, an output layer 113 comprising only nodes 131, 132 without outgoing edges, and hidden layers 111, 112 in-between the input layer 110 and the output layer 113. In general, the number of hidden layers 111, 112 can be chosen arbitrarily. The number of nodes 120-122 within the input layer 110 usually relates to the number of input values of the neural network, and the number of nodes 131, 132 within the output layer 113 usually relates to the number of output values of the neural network.

In particular, a (real) number can be assigned as a value to every node 120-132 of the neural network 100. Here, $x^{(n)}_i$ denotes the value of the i-th node 120-132 of the n-th layer 110-113. The values of the nodes 120-122 of the input layer 110 are equivalent to the input values of the neural network 100, the values of the nodes 131, 132 of the output layer 113 are equivalent to the output value of the neural network 100. Furthermore, each edge 140-142 can comprise a weight being a real number, in particular, the weight is a real number within the interval [−1, 1] or within the interval [0, 1]. Here, $w^{(m,n)}_{i,j}$ denotes the weight of the edge between the i-th node 120-132 of the m-th layer 110-113 and the j-th node 120-132 of the n-th layer 110-113. Furthermore, the abbreviation $w^{(n)}_{i,j}$ is defined for the weight $w^{(n,\ n+1)}_{i,j}$.

In particular, to calculate the output values of the neural network 100, the input values are propagated through the neural network. In particular, the values of the nodes 120-132 of the (n+1)-th layer 110-113 can be calculated based on the values of the nodes 120-132 of the n-th layer 110-113 by $$x^{(n+1)}_j = f\left(\sum_i x^{(n)}_i \cdot w^{(n)}_{i,j}\right)$$

Herein, the function f is a transfer function (another term is "activation function"). Known transfer functions are step functions, sigmoid function (e.g. the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the first hidden layer 111 can be calculated based on the values of the input layer 110 of the neural network, wherein values of the second hidden layer 112 can be calculated based in the values of the first hidden layer 111, etc.

In order to set the values $w^{(m,n)}_{i,j}$ for the edges, the neural network 100 has to be trained using training data. In particular, training data comprises training input data and training output data (denoted as $t_i$). For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein γ is a learning rate, and the numbers $\delta^{(n)}_j$ can be recursively calculated as $$\delta^{(n)}_j = \left(\sum_k \delta^{(n+1)}_k \cdot w^{(n+1)}_{jk}\right) \cdot f'\left(\sum_i x^{(n)}_i \cdot w^{(n)}_{i,j}\right)$$

based on $\delta^{(n+1)}_j$, if the (n+1)-th layer is not the output layer, and $$\delta^{(n)}_j = \left(x^{(n+1)}_k - t^{(n+1)}_j\right) \cdot f'\left(\sum_i x^{(n)}_i \cdot w^{(n)}_{i,j}\right)$$

if the (n+1)-th layer is the output layer 113, wherein f' is the first derivative of the activation function, and $y^{(n+1)}_j$ is the comparison training value for the j-th node of the output layer 113.

In some embodiments, the neural network 100 is configured, or trained, to generate a background radiation based attenuation map. For example, in some embodiments, the neural network 100 is configured to receive background radiation data collected by one or more detectors during a scan of a first patient. The neural network 100 can receive the background radiation data in any suitable form, such as, for example, a listmode or sinogram data, raw data, etc. The neural network 100 is trained to generate an attenuation map (e.g., mu-map).

Figure 3:
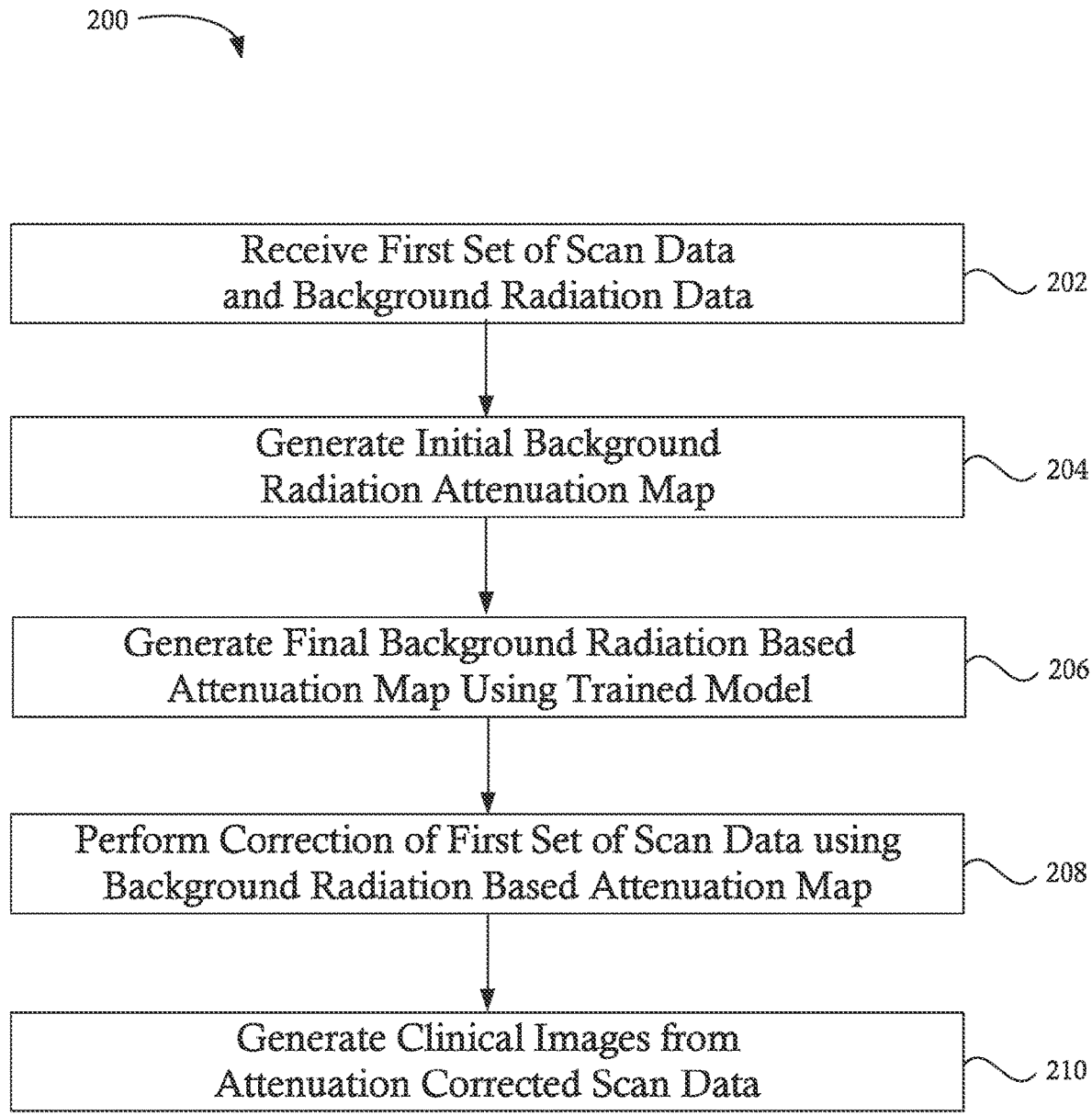
FIG. 3 is a flowchart illustrating a method of image reconstruction including attenuation correction using LSO/LYSO background radiation data, in accordance with some embodiments.
Figure 4:
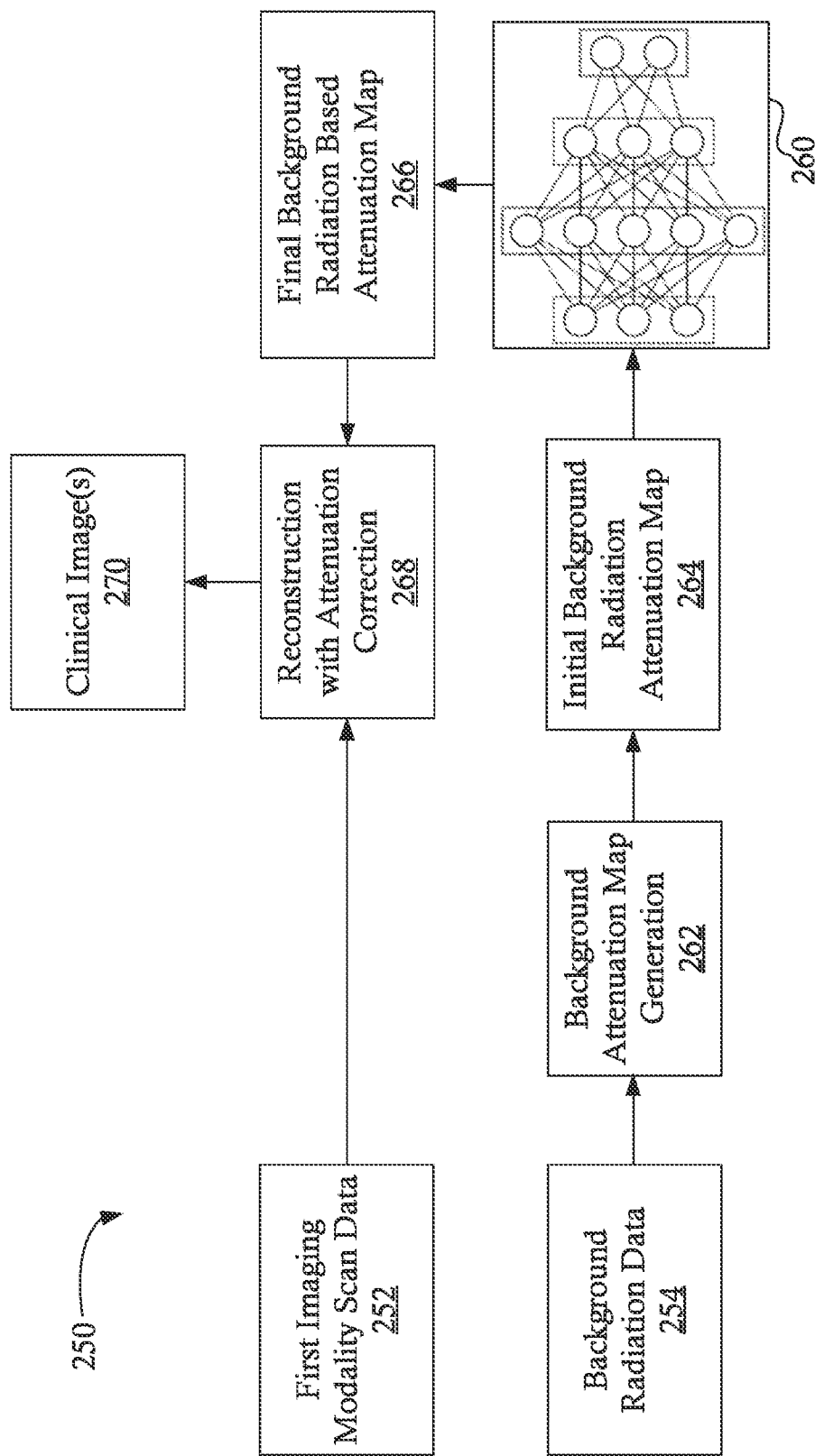
FIG. 4 is a process flow for performing image reconstruction including attenuation correction using LSO/LYSO background radiation data according to the method illustrated in FIG. 3, in accordance with some embodiments.

FIG. 3 is a flowchart 200 illustrating a method of attenuation correction using LSO/LYSO background radiation data, in accordance with some embodiments. FIG. 4 is a process flow 250 for performing attenuation correction using LSO/LYSO background radiation data according to the method illustrated in FIG. 3, in accordance with some embodiments. At step 202, a first set of scan data 252 and a set of background radiation data 254 is received. The first set of scan data 252 is associated with a first imaging modality. The background radiation data 254 can be associated with a PET imaging modality. The background radiation data can include LSO (lutetium oxyorthosilicate)-based or LYSO (lutetium yttrium oxyorthosilicate)-based background radiation data. In some embodiments, a second set of scan data (not shown) associated with the second imaging modality is also received. Although specific embodiments are discussed herein, it will be appreciated that the disclosed systems and methods can be applied to any scan data and/or scan modalities including background radiation.

At step 204, an initial background radiation attenuation map 264 is generated from the LSO/LYSO background radiation data 254 by a background attenuation map generation process 262. The initial background radiation attenuation map 264 can generated using any suitable generation process or algorithm, such as, for example, a MLTR process. At step 206, the initial background radiation attenuation map 264 is provided to a trained attenuation model 260 configured to generate a final (or enhanced) background radiation based attenuation map 266. The trained model 260 includes a machine learning model trained using a training data set, as discussed in greater detail below. In some embodiments, the trained attenuation model 260 includes a neural network. The trained attenuation model 260 enhances and/or improves the initial background radiation attenuation map 264 to generate the final (i.e., enhanced) background radiation based attenuation map 266. The final background radiation based attenuation map 266 is used to correct attenuation in the first set of scan data 252. The trained model 260 can include one or more iterative processes for generating the final background radiation based attenuation map 266, including, but not limited to, applying one or more traditional mu-map generation algorithms. As discussed in greater detail below, the trained attenuation model 260 can be trained using CT scan data and/or long scan LSO/LYSO data.

At step 208, attenuation correction is applied to the first set of scan data 252 and, at step 210, one or more clinical images are generated from the attenuation corrected first set of scan data 252. Although steps 208 and 210 are illustrated as separate steps, it will be appreciated that these steps can be performed as part of a single image reconstruction process 268. Attenuation correction is performed by an image reconstruction process 268 based at least in part on the final background radiation based attenuation map 266 using any suitable attenuation correction process.

The clinical images 270 can include, for example, diagnostic images, planning images, and/or any other suitable clinical images. The clinical images 270 can be stored on a non-transitory medium and/or provided to a clinician for use in diagnostics, planning, and/or other purposes. The one or more clinical images 270 can be stored as image files, as attenuation-corrected data, and/or using any other suitable storage method. In some embodiments, the first set of scan data is a PET data set, although it will be appreciated that attenuation correction can also be applied to a second set of scan data including other imaging modalities, such as, for example, SPECT. As discussed in greater detail below, the trained attenuation model 260 can be trained using CT scan data and/or long scan LYSO data.

The method of image reconstruction using background radiation attenuation maps discussed in conjunction with FIG. 3 provides distinct advantages over current systems. For example, current systems primarily rely on CT scans for generation of attenuation maps. The use of attenuation correction maps generated from LSO/LYSO background radiation enables the use of imaging systems without a CT component, reducing costs of the system, cost of operation, and reducing radiation exposure of the patient. Systems without CT components can be made smaller and therefore can be included in spaces not currently capable of supporting, for example, PET/CT systems. In systems including a CT component, the LSO/LYSO background radiation attenuation maps allows for more accurate when MLAA is used to generate attenuation map with attenuation map from background LSO/LYSO as input. The attenuation map output from MLAA can be matched to emission data thus reducing motion artifacts. Although specific advantages are discussed herein, it will be recognized that additional advantages beyond those discussed are provided by the method of attenuation correction using LSO/LYSO background radiation data discussed herein.

The use of LSO/LSYO background radiation attenuation maps further enables the use of long scan and/or repeated scans in additional clinical settings. For example, in some embodiments, the use of LSO/LSYO background radiation attenuation maps reduces or eliminates the need for CT scan, allowing longer or repeated scans to be applied to low-dose clinical applications, such as pediatric applications or theranostics. In some embodiments, the use of LSO/LSYO background radiation attenuation maps (and the corresponding reduction or elimination of CT scans) facilitates repeated scans for multiple hours after an initial injection of a tracer. For example, in various embodiments, certain tracers remain active for multiple hours (e.g., F18, G68, etc.) or days (e.g., Cu64, I124, Zr89) after injection and would allow two or more scans to be performed over the active time period. The use of LSO/LSYO background radiation attenuation maps eliminates the need for performing multiple (or even a single) CT scan, thus reducing radiation exposure and enabling multiple scans.

The use of LSO/LSYO background radiation attenuation maps enables the simultaneous collection of image data and attenuation data. For example, in some embodiments, such as LAFOV scans, the LSO-TX (transmission) and PET acquisition can be performed simultaneously. The simultaneous LSO-TX and PET acquisition enable motion tracking and error correction in both attenuation and emission. Although PET acquisition is discussed specifically, it will be appreciated that similar benefits may be obtained using alternative imaging modalities.

Figure 5:
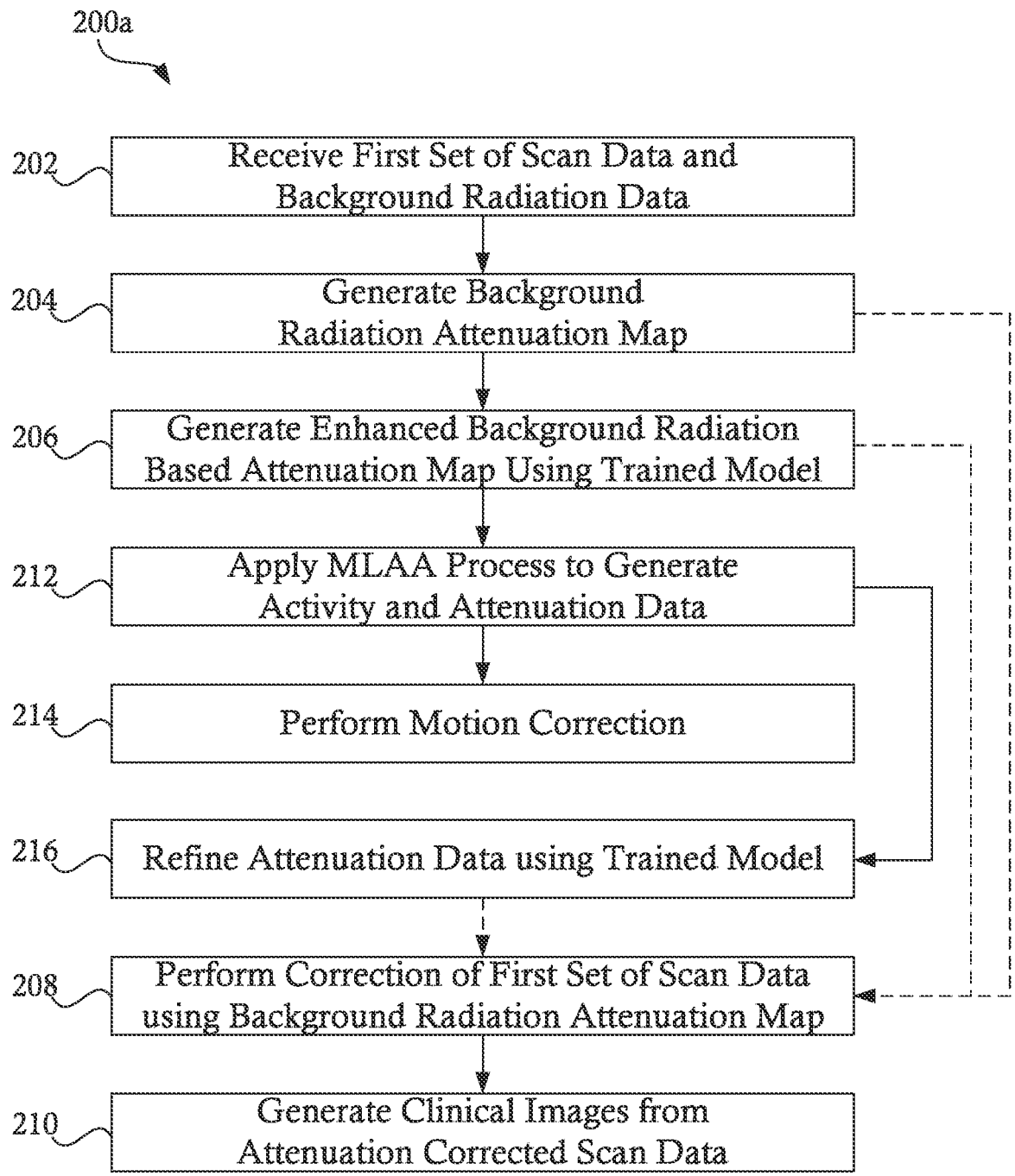
FIG. 5 is a flowchart illustrating a method of image reconstruction including attenuation correction using background radiation data, in accordance with some embodiments.
Figure 6:
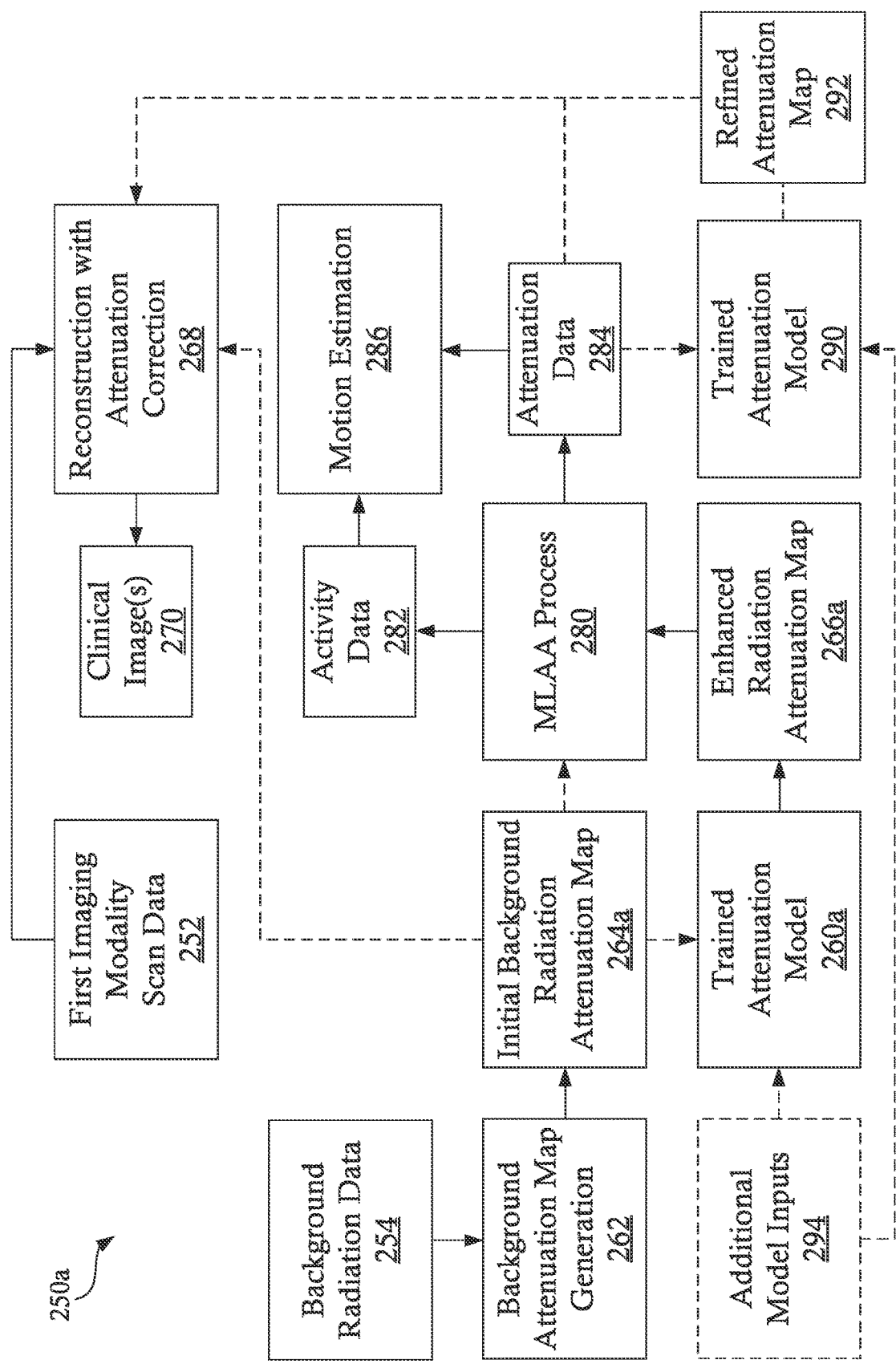
FIG. 6 is a process flow for performing image reconstruction including background radiation attenuation correction according to the method illustrated in FIG. 5, in accordance with some embodiments.

In some embodiments, the use of LAFOV modalities provides an increased number of LSO transmission lines through each image voxel, which facilitates short acquisition of LSO simultaneously with other imaging modalities, such as PET. LAFOV modalities confine a substantial portion (e.g., most or all) of the tracer activity inside of the FOV, providing for motion tracking and correction. FIG. 5 is a flowchart 200a illustrating a method of image reconstruction including attenuation correction using background radiation based attenuation maps generated from LAFOV imaging modalities, in accordance with some embodiments. FIG. 6 is a process flow 250a for performing image reconstruction including attenuation correction using background radiation attenuation maps generated from LAFOV imaging modalities, according to the method illustrated in FIG. 5, in accordance with some embodiments. The flowchart 200a and the process flow 250a are similar to the flowchart 200 and the process flow 250 discussed above, and similar description is not repeated herein.

In some embodiments, a background radiation attenuation map 264a can be provided to a trained attenuation model 260 for further refinement, can provided to a maximum likelihood estimation of activity and attenuation (MLAA) process 280, and/or can be provided to an attenuation correction process without refinement. For example, as discussed above, a trained attenuation model 260a may be configured to convert an initial background radiation attenuation map 264a to an enhanced background radiation attenuation map 266a, as discussed above in conjunction with FIGS. 3 and 4. The trained attenuation model 260a is similar to the trained attenuation model 260 discussed above, and similar description is not repeated herein. The trained attenuation model 260a can be configured to receive one or more additional inputs 294 (either during training and/or during refinement of the initial background radiation attenuation map 264a). For example, in some embodiments, the trained attenuation model 260a is configured to receive an MRI image and/or an attenuation map generated from MRI data. The MRI image and/or the MRI attenuation map can be generated before, simultaneously with, and/or after acquisition of the LSO/LYSO background radiation and/or acquisition of an additional imaging modality, such as PET. As noted above, in some embodiments, the trained attenuation model 260a is configured to generate an enhanced background radiation attenuation map 266a that may be used directly for attenuation correction and/or used for further processing.

In some embodiments, at step 212, the initial background radiation attenuation map 264a and/or the enhanced background radiation attenuation map 266a is provided to a MLAA process 280 as an initial image for use during attenuation and emission estimating. The MLAA process 280 can include a time-of-flight (TOF) MLAA process. The MLAA process 280 is configured to generate activity data 282 and attenuation data 284 from the initial background radiation attenuation map 264a and/or the enhanced background radiation attenuation map 266a. The attenuation data 284 may include any suitable attenuation information, such as, for example, a background radiation inclusive attenuation map.

At step 214, the activity data 282 and the attenuation data 284 can be used for motion estimation 286. The motion estimation 286 estimates motion of a patient during imaging to provide for correction of motion artifacts and/or to assist in attenuation correction. For example, in some embodiments, the background radiation (e.g., LSO/LYSO) transmission data and TOF MLAA data can be divided into frames and fed into a TOF-MLAA process 280 to generate activity data 282, which is used for motion estimation 286 between frames. In other embodiments, the attenuation data 284 may be used in conjunction with the activity data 282 for motion estimation.

The attenuation data 284 generated by the MLAA process 280 can have a poor signal-to-noise ratio (SNR). At optional step 216, the attenuation data 284 can be provided to a trained model 290, such as a trained attenuation model and/or other trained model, configured to improve the quality of the attenuation data 284, for example, by improving the SNR of the attenuation data 284. The trained model 290 may be configured to output a refined attenuation map 292 for use in one or more attenuation correction processes.

In various embodiments, a generated attenuation map, such as any one of the initial attenuation map 264a, the enhanced background radiation attenuation map 266a, and/or the refined attenuation map 292, may be used for one or more attenuation processes. For example, in some embodiments, attenuation maps may be generated and used for attenuation correction during multiple, repeated scans of the same patient over a predetermined time period. As another example, in some embodiments, the generated attenuation maps may be used for attenuation correction in low-dose radiation application, such as low-dose pediatric applications and/or low-dose theranostics applications.

Figure 7:
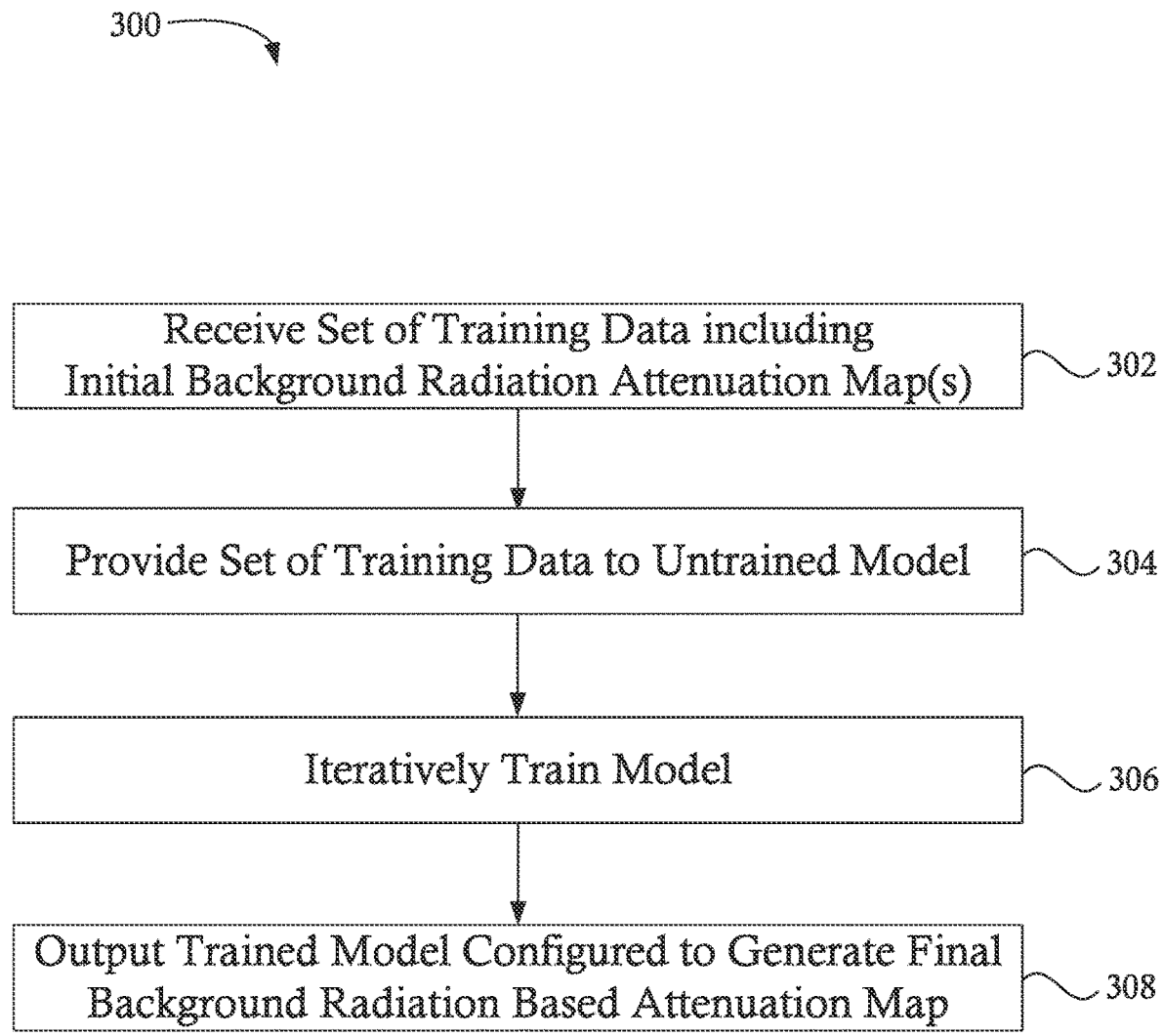
FIG. 7 is a flowchart illustrating a method of training a machine learning function for use in the method of attenuation correction illustrated in FIG. 3, in accordance with some embodiments.
Figure 8:
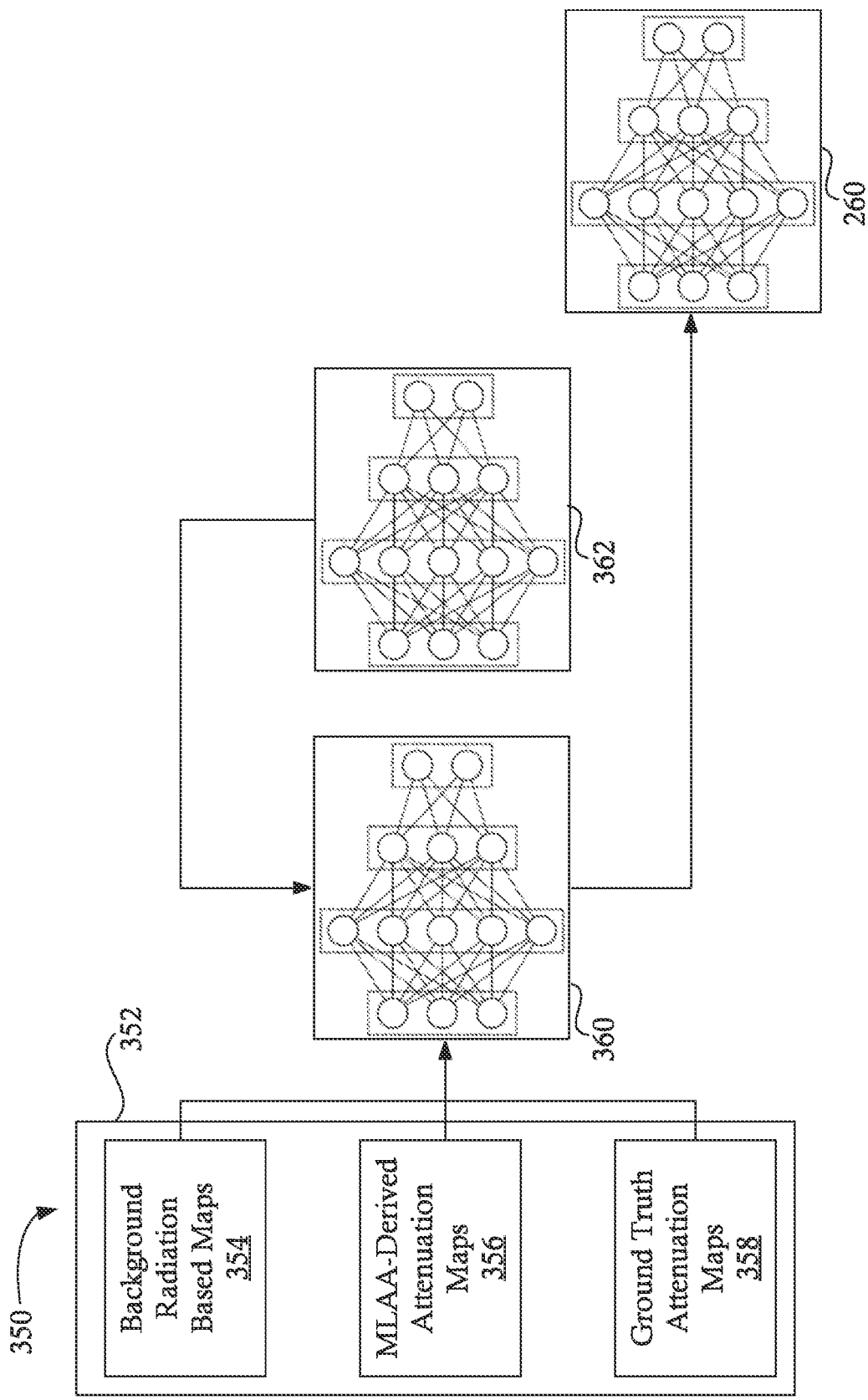
FIG. 8 is a process flow for training a machine learning function according to the method illustrated in FIG. 7, in accordance with some embodiments.

FIG. 7 is a flowchart 300 illustrating a method of training a machine learning model to generate a background radiation based attenuation map, in accordance with some embodiments. FIG. 8 is a process flow 350 for training a machine learning model according to the method illustrated in FIG. 7, in accordance with some embodiments. At step 302, a set of training data 352 is received. The set of training data includes labeled data configured to iteratively train an untrained machine learning model 358 to generate a background radiation based attenuation map. The set of training data 352 can include a set of initial background radiation attenuation maps 354, a set of MLAA-generated background radiation inclusive attenuation maps 356, and/or a set of associated ground truth attenuation maps 358. The set of ground truth attenuation maps 358 can be generated by mapping LSO/LYSO background radiation data onto image data from a second imaging modality, such as, for example, a CT imaging modality, generated based on a long-scan LSO/LYSO background radiation data, generated using any other suitable attenuation map generation process, and/or a combination thereof.

In some embodiments, the set of training data 352 can include raw background radiation data and/or TOF PET data and the respective initial background radiation attenuation maps 354 and/or MLAA-generated background radiation inclusive attenuation maps 356 can be generated from the raw data and provided to the untrained model 358. For example, in some embodiments, a set of initial background radiation attenuation maps 354 can be generated from LSO/LYSO background radiation data using a MLTR process. As another example, in some embodiments, a set of MLAA-generated background radiation inclusive attenuation maps 356 can be generated from a set of initial background radiation attenuation maps 354 and raw TOF PET data using a MLAA-process.

At step 304, the set of training data 352 is provided to the untrained machine learning model 360 and, at step 306, the untrained machine learning model 360 performs an iterative training process. In some embodiments, the iterative training process includes training a first set of embedding (or hidden) layers to refine an initial background radiation attenuation map, for example, by comparing to the initial background radiation attenuation map to a corresponding one of the ground truth attenuation maps 356 and making adjustments to the untrained machine learning model 360 based on identified differences. In embodiments including an MLAA-generated background radiation inclusive attenuation maps 356, the machine learning model 360 can be iteratively trained to refine the MLAA-generated background radiation inclusive attenuation map, for example, to increase the SNR, by comparing the MLAA-generated background radiation inclusive attenuation maps 356 to ground truth attenuation maps 358. In some embodiments, an intermediate machine learning model 362 is generated and is used in subsequent iterative training steps. The intermediate machine learning model 362 is further refined using the set of training data 352 to generate a trained machine learning model 260. Although embodiments are discussed herein including an untrained machine learning model 360, it will be appreciated that a previously trained machine learning model can be used as an initial learning model 360 for use in the iterative training process.

At step 308, the trained machine learning model 260 is output. The trained machine learning model 260 is configured to generate a final background radiation based attenuation map for use in attenuation correction. The trained machine learning model 260 can be used to generate final background radiation based attenuation maps for attenuation correction of scan data according to the methods discussed herein, for example, as discussed in conjunction with FIG. 3.

A first embodiment includes a computer-implemented method for attenuation correction. The computer-implemented method includes steps of receiving a first set of nuclear scan data including first scan data associated with a first imaging modality having a long-axial field of view and first background radiation data, generating a first background radiation attenuation map by applying a trained machine-learning model to the first background radiation data, generating a first set of attenuation corrected scan data by performing attenuation correction of the first scan data based only on the first background radiation attenuation map, and reconstructing a first image from the first set of attenuation corrected scan data.

In the first embodiment, the method can further include the steps of receiving a second set of nuclear scan data including second scan data associated with the first imaging modality and second background radiation data, generating a second background radiation attenuation map by applying the trained machine-learning model to the second background radiation data, generating a second set of attenuation corrected scan data by performing attenuation correction of the second scan data based only on the second background radiation attenuation map, and reconstructing a second image from the second set of attenuation corrected scan data.

The second set of nuclear scan data can be obtained a predetermined time period after the first set of nuclear scan data. The first set of nuclear scan data and the second set of nuclear scan data can be generated based on emissions from a single dose of tracer.

In the first embodiment, the trained machine-learning model can be trained by mapping background radiation attenuation maps to computerized tomography (CT) attenuation maps and/or trained by mapping background radiation attenuation maps to long-scan background radiation based attenuation maps generated using a known emission source.

In the first embodiment, the trained machine-learning model can generate an initial background radiation attenuation map. The first background radiation attenuation map can be generated by applying a maximum likelihood estimation of activity and attenuation (MLAA) process. Reconstructing the first image from the first set of attenuation corrected scan data can include applying motion correction based on activity data generated by the MLAA process.

In the first embodiment, the first imaging modality can be a positron emission tomography (PET) modality. The first background radiation data and/or the second background radiation data can be captured by LSO (lutetium oxyorthosilicate)-based and/or LYSO (lutetium yttrium oxyorthosilicate)-based detectors.

In a second embodiment, a system includes a first imaging modality having a long-axial field of view that is configured to generate a first set of scan data, a plurality of detectors configured to generate background radiation data, a non-transitory memory having instructions stored thereon, The processor is configured to read the instructions to generate a first background radiation attenuation map by applying a trained machine-learning model to the first background radiation data, generate a first set of attenuation corrected scan data by performing attenuation correction of the first scan data based only on the first background radiation attenuation map, and reconstruct a first image from the first set of attenuation corrected scan data.

In the second embodiment, the processor can be configured to read the instructions to receive a second set of nuclear scan data including second scan data associated with the first imaging modality and second background radiation data, generate a second background radiation attenuation map by applying the trained machine-learning model to the second background radiation data, generate a second set of attenuation corrected scan data by performing attenuation correction of the second scan data based only on the second background radiation attenuation map, and reconstruct a second image from the second set of attenuation corrected scan data. The second set of nuclear scan data is obtained a predetermined time period after the first set of nuclear scan data.

In the second embodiment, the first set of nuclear scan data and the second set of nuclear scan data can be generated based on emissions from a single dose of tracer.

In the second embodiment, the trained machine-learning model can trained by mapping one or more initial background radiation attenuation maps to computerized tomography (CT) attenuation maps and/or by mapping background radiation attenuation maps to long-scan background radiation based attenuation maps generated using a known emission source.

In the second embodiment, the trained machine-learning model generates an initial background radiation attenuation map. The first background radiation attenuation map is generated by applying a maximum likelihood estimation of activity and attenuation (MLAA) process. The first image can be reconstructed from the first set of attenuation corrected scan data includes applying motion correction based on activity data generated by the MLAA process.

The detectors of the second embodiment can include LSO (lutetium oxyorthosilicate)-based or LYSO (lutetium yttrium oxyorthosilicate)-based detectors.

A third embodiment includes a method of nuclear imaging. The method includes the steps of applying a dose of imaging tracer, obtaining a first set of nuclear scan data including first scan data associated with a first imaging modality having a long-axial field of view and first background radiation data, generating a first background radiation attenuation map by applying a trained machine-learning model to the first background radiation data, generating a first set of attenuation corrected scan data by performing attenuation correction of the first scan data based only on the first background radiation attenuation map, obtaining a second set of nuclear scan data including second scan data associated with the first imaging modality and second background radiation data, generating a second background radiation attenuation map by applying the trained machine-learning model to the second background radiation data, generating a second set of attenuation corrected scan data by performing attenuation correction of the second scan data based only on the second background radiation attenuation map, and reconstructing a first image from the first set of attenuation corrected scan data and a second image from the second set of attenuation corrected scan data. The first set of nuclear scan data is based on the dose of imaging tracer and is obtained at a first time and the second set of nuclear scan data is based on the dose of imaging tracer and is obtained at a second time.

In the third embodiment, the trained machine-learning model can generate initial background radiation attenuation maps. Each of the first background radiation attenuation map and the second background radiation attenuation map can be generated by applying a maximum likelihood estimation of activity and attenuation (MLAA) process to a corresponding initial background radiation attenuation map.

In the third embodiment, the dose of imaging tracer can be configured for a low-dose application.

In the third embodiment, the trained machine-learning model is generated by a set of training data comprising background radiation attenuation maps and ground truth attenuation maps. Each of the ground truth attenuation maps is associated with one of the background radiation attenuation maps.

Although the subject matter has been described in terms of embodiments, the claims should be construed broadly, to include other variants and embodiments, which may be made by those skilled in the art.

What is claimed is:

1. A computer-implemented method for attenuation correction, comprising:

receiving a first set of nuclear scan data including first scan data associated with a first imaging modality having a long-axial field of view and first background radiation data;

generating a first background radiation attenuation map by applying a trained machine-learning model to the first background radiation data;

generating a first set of attenuation corrected scan data by performing attenuation correction of the first scan data based only on the first background radiation attenuation map; and reconstructing a first image from the first set of attenuation corrected scan data, wherein the trained machine-learning model generates an initial background radiation attenuation map, and wherein the first background radiation attenuation map is generated by applying a maximum likelihood estimation of activity and attenuation (MLAA) process, and wherein reconstructing the first image from the first set of attenuation corrected scan data includes applying motion correction based on activity data generated by the MLAA process.

2. The computer-implemented method of claim 1, comprising:
receiving a second set of nuclear scan data including second scan data associated with the first imaging modality and second background radiation data;
generating a second background radiation attenuation map by applying the trained machine-learning model to the second background radiation data;
generating a second set of attenuation corrected scan data by performing attenuation correction of the second scan data based only on the second background radiation attenuation map; and
reconstructing a second image from the second set of attenuation corrected scan data.

3. The computer-implemented method of claim 2, wherein the second set of nuclear scan data is obtained a predetermined time period after the first set of nuclear scan data.

4. The computer-implemented method of claim 2, wherein the first set of nuclear scan data and the second set of nuclear scan data are generated based on emissions from a single dose of tracer.

5. The computer-implemented method of claim 1, wherein the trained machine-learning model is trained by mapping background radiation attenuation maps to computerized tomography (CT) attenuation maps.

6. The computer-implemented method of claim 1, wherein the trained machine-learning model is trained by mapping background radiation attenuation maps to long-scan background radiation based attenuation maps generated using a known emission source.

7. The computer-implemented method of claim 1, wherein the first imaging modality is a positron emission tomography (PET) modality.

8. A system, comprising:
a first imaging modality configured to generate a first set of scan data, wherein the first imaging modality has a long-axial field of view; and
a plurality of detectors configured to generate background radiation data;
a non-transitory memory having instructions stored thereon and a processor configured to read the instructions to:
generate a first background radiation attenuation map by applying a trained machine-learning model to the first background radiation data;
generate a first set of attenuation corrected scan data by performing attenuation correction of the first scan data based only on the first background radiation attenuation map; and
reconstruct a first image from the first set of attenuation corrected scan data, wherein the trained machine-learning model generates an initial background radiation attenuation map, and wherein the first background radiation attenuation map is generated by applying a maximum likelihood estimation of activity and attenuation (MLAA) process, and wherein reconstructing the first image from the first set of attenuation corrected scan data includes applying motion correction based on activity data generated by the MLAA process.

9. The system of claim 8, wherein the processor is configured to read the instructions to:
receive a second set of nuclear scan data including second scan data associated with the first imaging modality and second background radiation data, wherein the second set of nuclear scan data is obtained a predetermined time period after the first set of nuclear scan data;
generate a second background radiation attenuation map by applying the trained machine-learning model to the second background radiation data;
generate a second set of attenuation corrected scan data by performing attenuation correction of the second scan data based only on the second background radiation attenuation map; and
reconstruct a second image from the second set of attenuation corrected scan data.

10. The system of claim 9, wherein the first set of nuclear scan data and the second set of nuclear scan data are generated based on emissions from a single dose of tracer.

11. The system of claim 8, wherein the trained machine-learning model is trained by mapping one or more initial background radiation attenuation maps to computerized tomography (CT) attenuation maps.

12. The system of claim 8, wherein the trained machine-learning model is trained by mapping background radiation attenuation maps to long-scan background radiation based attenuation maps generated using a known emission source.

13. A method of nuclear imaging, comprising:
applying a dose of imaging tracer;
obtaining a first set of nuclear scan data including first scan data associated with a first imaging modality having a long-axial field of view and first background radiation data, wherein the first set of nuclear scan data is based on the dose of imaging tracer and is obtained at a first time;
generating a first background radiation attenuation map by applying a trained machine-learning model to the first background radiation data;
generating a first set of attenuation corrected scan data by performing attenuation correction of the first scan data based only on the first background radiation attenuation map;
obtaining a second set of nuclear scan data including second scan data associated with the first imaging modality and second background radiation data, wherein the second set of nuclear scan data is based on the dose of imaging tracer and is obtained at a second time;
generating a second background radiation attenuation map by applying the trained machine-learning model to the second background radiation data;
generating a second set of attenuation corrected scan data by performing attenuation correction of the second scan data based only on the second background radiation attenuation map; and
reconstructing a first image from the first set of attenuation corrected scan data and a second image from the second set of attenuation corrected scan data, wherein the trained machine-learning model generates an initial background radiation attenuation map, and wherein the first background radiation attenuation map is generated by applying a maximum likelihood estimation of activity and attenuation (MLAA) process, and wherein reconstructing the first image from the first set of attenuation corrected scan data includes applying motion correction based on activity data generated by the MLAA process.

14. The method of claim 13, wherein the trained machine-learning model generates initial background radiation attenuation maps, and wherein each of the first background radiation attenuation map and the second background radiation attenuation map are generated by applying a maximum likelihood estimation of activity and attenuation (MLAA) process to a corresponding initial background radiation attenuation map.

15. The method of claim 13, wherein the dose of imaging tracer is configured for a low-dose application.

16. The method of claim 13, wherein the trained machine-learning model is generated by a set of training data comprising background radiation attenuation maps and ground truth attenuation maps, wherein each of the ground truth attenuation maps is associated with one of the background radiation attenuation maps.

* * * * *